United States Patent [19]
Klavonich

[11] 3,858,463
[45] Jan. 7, 1975

[54] REAR WHEEL BRAKE ADJUSTMENT TOOL

[75] Inventor: Frank J. Klavonich, Jeannette, Pa.
[73] Assignee: Rose M. Klavonick, Jeannette, Pa.
[22] Filed: May 30, 1973
[21] Appl. No.: 365,143

[52] U.S. Cl. .............. 81/3 R, 81/145, 188/196 M, 188/79.5 GC, 269/321 B
[51] Int. Cl. ..................... B25b 27/00, F16d 71/02
[58] Field of Search............. 81/3 R, 142, 145, 158, 81/159; 29/270, 278; 188/79.5 GC, 196 M, 1 R; 254/95; 269/321 B

[56] References Cited
UNITED STATES PATENTS

| | | | |
|---|---|---|---|
| 506,261 | 10/1893 | Rosenberg | 81/142 |
| 2,043,546 | 6/1936 | Koenig | 81/3 R |
| 2,978,072 | 4/1961 | Burnett | 188/79.5 |
| 3,259,365 | 7/1966 | Gibson | 254/95 |

Primary Examiner—Al Lawrence Smith
Assistant Examiner—Roscoe V. Parker
Attorney, Agent, or Firm—Clarence A. O'Brien; Harvey B. Jacobson

[57] ABSTRACT

A tool for relieving the pressure of a lock bar on a brake adjustment spindle has a longitudinal member provided with a manipulating portion at one end and an abutment at the other end. This longitudinal member is arranged on a frame for moving a brake spindle lock bar to a position releasing a brake adjustment spindle associated with the lock bar. Once the longitudinal member has moved a lock bar into a spindle releasing position, notches arranged along one side of the longitudinal member are moved into engagement with a spring-biased pawl mounted on the frame to hold the longitudinal member in a position retaining the lock bar in its spindle releasing position. A projection is arranged on the frame for cooperating with the abutment and a brake drum to hold a lock bar in spindle releasing position.

5 Claims, 6 Drawing Figures

Patented Jan. 7, 1975

REAR WHEEL BRAKE ADJUSTMENT TOOL

BACKGROUND OF THE INVENTION

1. Field of the Invention

This invention relates generally to a tool for moving and holding a resiliently biased element, and particularly to a tool for use in adjusting a brake having an adjustment spindle by releasing the spindle from the pressure of an associated lock bar.

2. Description of the Prior Art

The rear wheel brakes of many standard automobiles have brake shoes that are adjusted by varying the distance between adjacent ends of the shoes. A length-adjustable member is commonly arranged between the shoe ends for effecting the adjustment. This adjustable member, or spindle, is frequently locked against movement which would change its setting by the pressure of a spring-biased lock bar. A disadvantage of this arrangement is that a mechanic must hold the lock bar off of the spindle, leaving only one hand available for brake adjustment purposes.

SUMMARY OF THE INVENTION

It is an object of the present invention to provide a tool for moving and holding a resiliently biased element.

It is another object of the present invention to provide a tool especially suited for relieving the pressure of a lock bar on a brake adjustment spindle.

It is yet another object of the present invention to provide a method for adjusting a brake of the kind having an adjustment spindle and associated lock bar.

This and other objects are achieved according to the present invention by providing a tool having: a longitudinal member arranged for moving a resiliently biased element such as a lock bar associated with a brake adjustment spindle; and an arrangement including a spring-biased pawl arranged for holding the longitudinal member and retaining the resiliently biased element in a moved position.

According to a preferred embodiment of a tool according to the present invention, the longitudinal member has spaced ends, and is provided with a manipulating portion at one end and an abutment at the other end.

A preferred holding arrangement for a tool according to the present invention has a frame provided with a handle portion arranged for positioning the frame, and a guide arrangement in which the longitudinal member is slidably received. A plurality of notches are advantageously provided along one side of the longitudinal member between the manipulating portion and abutment thereof, and a spring-biased pawl is arranged on the frame for interrelating with at least one of the notches when the latter are directed toward the pawl and locking the longitudinal member against sliding in the guide arrangement.

An advantageous feature of a tool according to the present invention has a projection provided on the frame and arranged for cooperating with the abutment of the longitudinal member and with a brake drum associated with the brake being adjusted for holding the associated lock bar in a spindle releasing position so as to free both hands of a mechanic and better able same to adjust the brake.

A brake is adjusted according to the present invention by the steps of: inserting a member into a brake drum and moving a brake spindle lock bar associated with the brake drum to a position releasing a brake adjustment spindle also associated with the lock bar; locking the inserted member relative to an associated frame and positioning the frame and member in retentive relationship with respect to the drum and lock bar and retaining the lock bar away from the spindle; and adjusting the brake by turning the spindle.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

Figure 1:
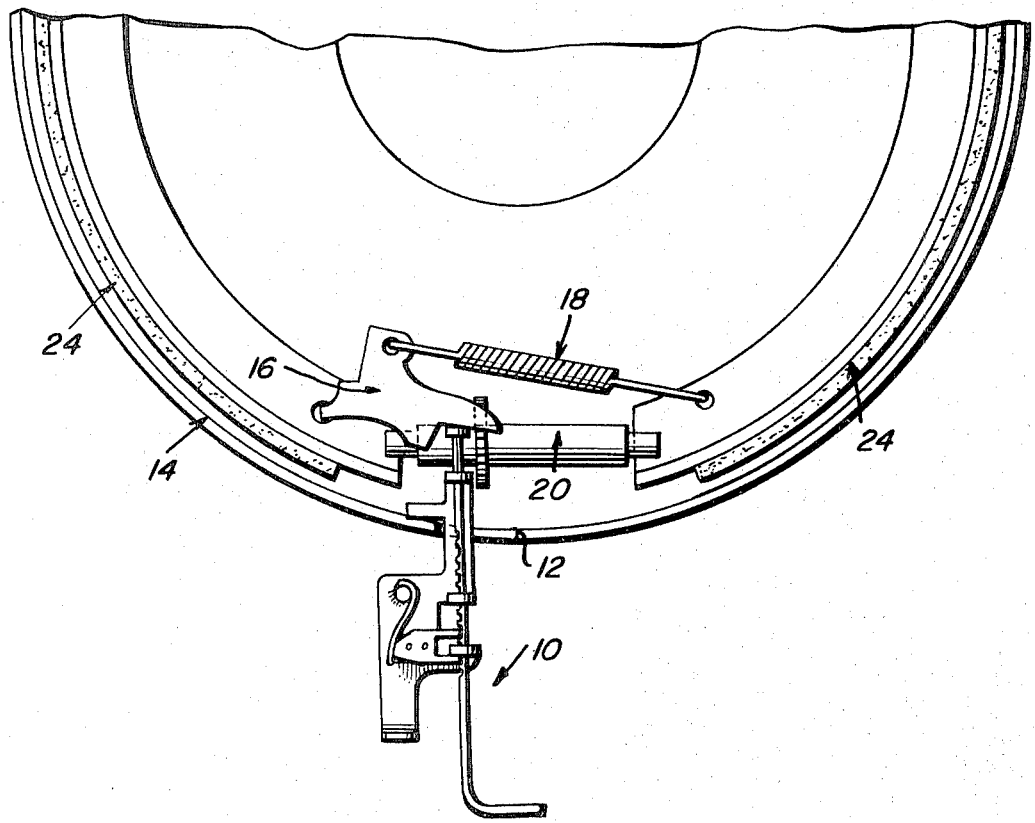
FIG. 1 is a fragmentary, side elevational view showing an adjusting tool according to the present invention in the initial stage of insertion into a brake drum of the kind having an adjustment spindle and associated lock bar.
Figure 2:
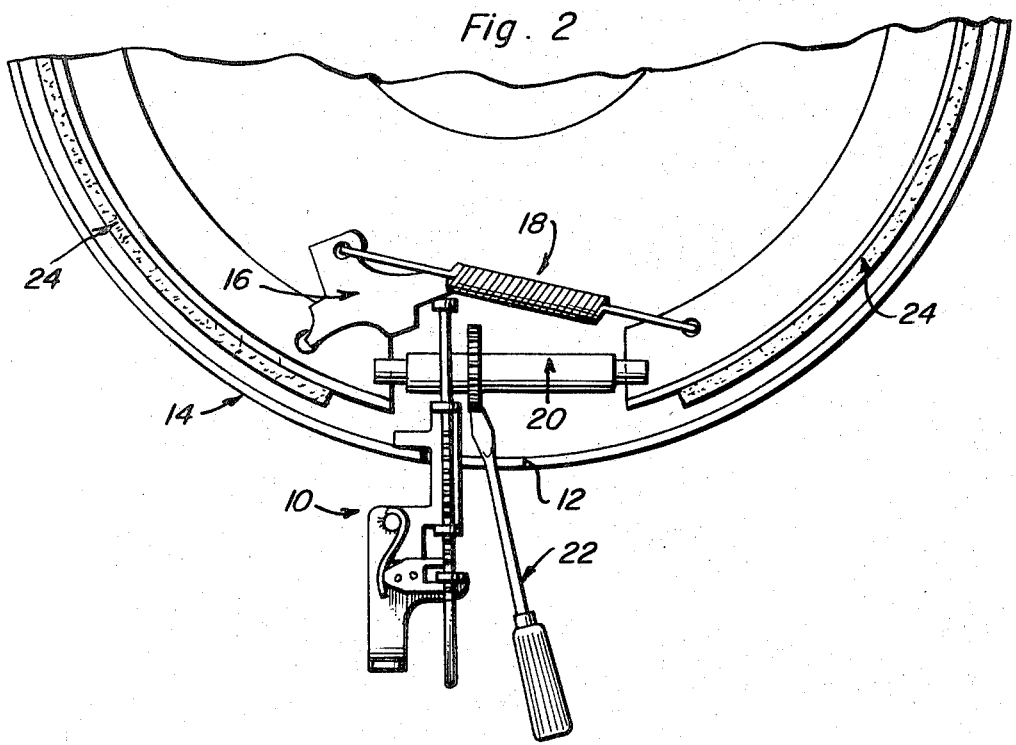
FIG. 2 is a fragmentary, side elevational view, similar to FIG. 1, but showing the lock bar in a moved and held position and the adjustment spindle being adjusted.
Figure 3:
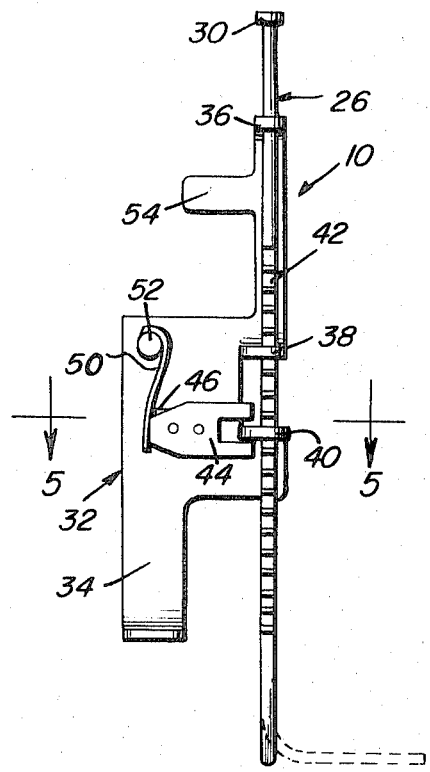
FIG. 3 is a side elevational view showing a tool according to the present invention.
Figure 4:
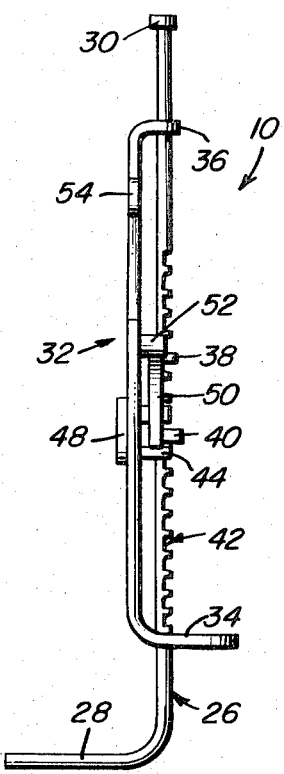
FIG. 4 is a plan view showing a tool according to the present invention as seen from the left in FIG. 3.
Figure 5:
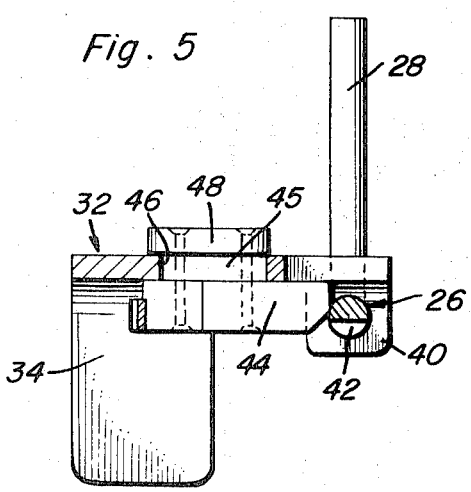
FIG. 5 is a sectional view taken generally along the line 5—5 of FIG. 3.
Figure 6:
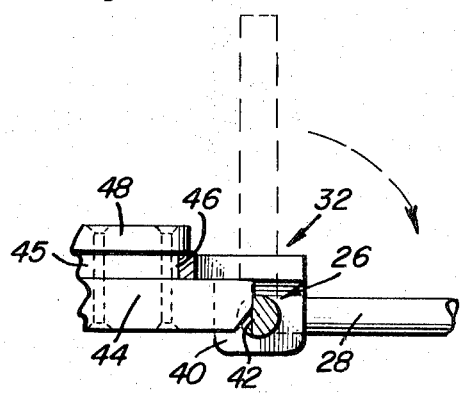
FIG. 6 is a fragmentary, sectional view similar to FIG. 5, but showing certain elements in a different relationship.

FIGS. 1 and 2 of the drawings show a tool 10 according to the present invention inserted through an opening 12 in a brake drum 14. Brake drums of the kind with which tool 10 is specifically intended to be used are conventionally provided with an opening such as opening 12. As is shown in FIG. 2, tool 10 is operated to move a brake spindle lock bar 16 against the bias of a conventional coiled spring 18 to a position releasing a brake adjustment spindle 20 associated with lock bar 16. The lock bar is pivotally mounted within brake drum 14 as is conventional. The portion of tool 10 which advances to move the lock bar 16 is now locked relative to an associated tool frame, and the frame and portion abutting lock bar 16 are positioned in retentive relationship with respect to drum 14 and lock bar 16 for retaining lock bar 16 away from spindle 20. This relationship is that shown in FIG. 2 of the drawings. Alternatively, when using tool 10 with brake systems (not shown) in which the lock bar pivots toward an opening equivalent to opening 12, the advanceable portion of tool 10 may engage the lock bar as by a hooking operation, and the like, in a manner not shown and the frame arranged abutting the drum 14 adjacent opening 12. A conventional screwdriver 22 is shown as an example of a tool which may be used to rotate spindle 20 and vary the length thereof to adjust brake shoes 24. Since the actual adjustment of the brake is conventional and well known, it will not be discussed in great detail herein.

Referring now to FIGS. 3 to 6 of the drawings, the portion of tool 10 which is advanceable against lock bar 16 is a longitudinal member 26 having spaced ends, with a manipulating portion 28 in the form of a bent section at one end, and an abutment 30 in the form of a nut threaded onto member 26 at the other end. As indicated above, member 26 is arranged for moving lock bar 16 to a position as shown in FIG. 2 in which spindle 20 is released and conditioned for adjustment.

The remainder of tool 10 may be generally referred to as an arrangement for holding longitudinal member 26, although it has other functions as will become apparent below. This holding arrangement includes a frame 32 provided with a handle portion 34 arranged for positioning frame 32, and with a plurality of guides 36, 38, and 40. Longitudinal member 26 is slidably arranged in these guides, but may be selectively held in a manner to be described below for retaining lock bar 16 in a spindle releasing position.

Longitudinal member 26 is provided with a plurality of notches 42 arranged only along one longitudinal side of member 26. These notches 42 are arranged between manipulating portion 28 and abutment 30. As may best be seen by referring to FIGS. 5 and 6 of the drawings, the position of notches 42 determines the ability of longitudinal member 26 to slide in guides 36, 38, and 40. A pawl 44 forms the important portion of an arrangement for interrelating with at least one of notches 42, a pair of these notches 42 in the illustrated embodiment, and locking member 26 against sliding movement in the guides. This pawl 44 is connected to a sliding guide 45 arranged in an opening 46 provided in frame 32. A plate 48 is attached to guide 45 and arranged on the side of frame 32 opposite that where pawl 44 is arranged to complete the assembly. A leaf spring 50, and the like, is mounted on a post 52 in a suitable, known manner, and is arranged to bias pawl 44 toward longitudinal member 26 and its notches 42. Opening 46 is configured to permit guide 45, and therefore pawl 44, to move toward and away from member 26. The combination of spring 50 with pawl 44 and the associated elements forms a spring pawl arrangement.

Frame 32 is further provided with a projection 54 arranged for cooperating with abutment 30 and brake drum 14 for holding lock bar 16 in a position releasing spindle 20 for adjustment. This is, of course, the position shown in FIG. 2 of the drawings. Thus, projection 54 is the portion of frame 32 which abuts drum 14 adjacent opening 12 and permits a mechanic (not shown), and the like, to have both hands available to carry out the conventional brake adjustment part of the operation.

As can be readily understood from the above description and from the drawings, a tool 10 according to the present invention greatly facilitates the process of adjusting a vehicle brake of the type having a lock bar and adjusting spindle arrangement of the general type illustrated in FIGS. 1 and 2.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:
1. A tool for relieving the pressure of a lock bar on a brake adjustment spindle, comprising, in combination:

a. means for moving a brake spindle lock bar to a position releasing a brake adjustment spindle associated with the lock bar; and
b. means for holding the means for moving in a position retaining the lock bar in a spindle releasing position;
c. the means for moving includes a longitudinal member having spaced ends, a manipulating portion provided at one end and an abutment at the other end, the means for holding including:
  i. a frame provided with a handle portion arranged for positioning the frame, and with a guide;
  ii. a plurality of notches provided in the longitudinal member and arranged between the manipulating portion and the abutment, the longitudinal member slidably arranged in the guide; and
  iii. means for interrelating with at least one of the notches and locking the longitudinal member against sliding movement in the guide, the notches being arranged along only one longitudinal side of the longitudinal member and the longitudinal member being disrelated from the means for interrelating by rotation of the longitudinal member about the longitudinal extent of same, and the means for interrelating including a pawl slidably mounted on the frame and arranged for sliding movement toward and away from the longitudinal member, and spring means mounted on the frame for biasing the pawl toward the longitudinal member and forming a spring pawl arrangement.

2. A structure as defined in claim 1, wherein the frame is further provided with a projection arranged for cooperating with the abutment and a brake drum for holding a lock bar in spindle releasing position.

3. A tool for moving and holding a resiliently biased element, comprising, in combination:
a. means for moving a resiliently biased element; and
b. means for holding the means for moving and retaining the element in a moved position, the means for moving including a longitudinal member having spaced ends, a manipulating portion provided at one end and an abutment at the other end, and the means for holding including:
  i. a frame provided with a handle portion arranged for positioning the frame, and with a guide;
  ii. a plurality of notches provided only along one longitudinal side of the longitudinal member and arranged between the manipulating portion and the abutment, the longitudinal member slidably arranged in the guide;
  iii. means for interrelating with at least one of the notches and locking the longitudinal member against sliding in the guide, said means for interrelating including a pawl slidably mounted on the frame and arranged for sliding movement toward and away from the longitudinal member, and spring means mounted on the frame for biasing the pawl toward the longitudinal member and forming a spring pawl arrangement, the longitudinal member being disrelated from the means for interrelating by rotation of the longitudinal member abour the longitudinal extent of same.

4. A structure as defined in claim 3, wherein the frame is further provided with a projection arranged for cooperating with the abutment and a brake drum for holding a lock bar in spindle releasing position.

5. A tool for relieving the pressure of a lock bar on a brake adjustment spindle, comprising, in combination:
- a. means for moving a brake spindle lock bar to a position releasing a brake adjustment spindle associated with the lock bar, the means for moving including a longitudinal member having spaced ends, a manipulating portion being provided at one end and an abutment at the other end;
- b. means including a frame for holding the means for moving in a position retaining the lock bar in a spindle releasing position, the frame provided with a projection arranged for cooperating with the abutment by abuting with an inner surface of a brake drum for holding a lock bar associated with the brake drum in spindle releasing position;
- c. said frame being provided with a handle portion arranged for positioning the frame, and being further provided with a guide;
- d. a plurality of notches provided in the longitudinal member and arranged between the manipulating portion and the abutment, the longitudinal member being slidably arranged in the guide; and
- e. means for interrelating with at least one of the notches and locking the longitudinal member against sliding movement in the guide.

* * * * *